(12) United States Patent
Roe et al.

(10) Patent No.: US 6,481,673 B1
(45) Date of Patent: Nov. 19, 2002

(54) MUFFLER HANGER SYSTEM

(75) Inventors: Thomas O. Roe, Stoughton, WI (US); Kenneth D. Nordlie, McFarland, WI (US); Gary G. Kolman, Mineral Point, WI (US); Jeffrey W. Zisser, Janesville, WI (US); Scott B. Guetschow, Oregon, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/973,813

(22) Filed: Oct. 10, 2001

(51) Int. Cl.[7] .................................................. F16L 3/00
(52) U.S. Cl. .......................................... 248/62; 248/300
(58) Field of Search ........................... 248/300, 58, 59, 248/62, 65, 74.1, 74.2, 74.3, 230.8, 230.9, 230.1

(56) References Cited

U.S. PATENT DOCUMENTS

| | | | |
|---|---|---|---|
| 1,882,555 A | 10/1932 | Gray | |
| 2,375,513 A | * 5/1945 | Bach | 248/59 |
| 3,014,681 A | 12/1961 | Feil, Jr. | |
| 3,539,138 A | * 11/1970 | Desroches | 248/300 X |
| 3,746,127 A | 7/1973 | Leventhal | |
| 4,296,907 A | 10/1981 | Ishida et al. | |
| 4,309,019 A | 1/1982 | Bloom | |
| 4,379,537 A | * 4/1983 | Perrault et al. | 248/74.1 |
| 5,009,386 A | * 4/1991 | Berger et al. | 248/62 X |
| 5,310,158 A | 5/1994 | Cassel | |
| 5,398,907 A | 3/1995 | Kelchner | |
| 5,908,187 A | 6/1999 | Kalkoske et al. | |
| 5,924,655 A | * 7/1999 | Rinderer | 248/58 X |

* cited by examiner

Primary Examiner—Ramon O. Ramirez
(74) Attorney, Agent, or Firm—Andrus, Sceales, Starke & Sawall, LLP

(57) ABSTRACT

A muffler hanger system includes a U-shaped bracket having a pair of legs securable to a support, and a bight extending between the legs, and a band extending around the muffler and the bight and supporting the muffler from the bight.

18 Claims, 2 Drawing Sheets

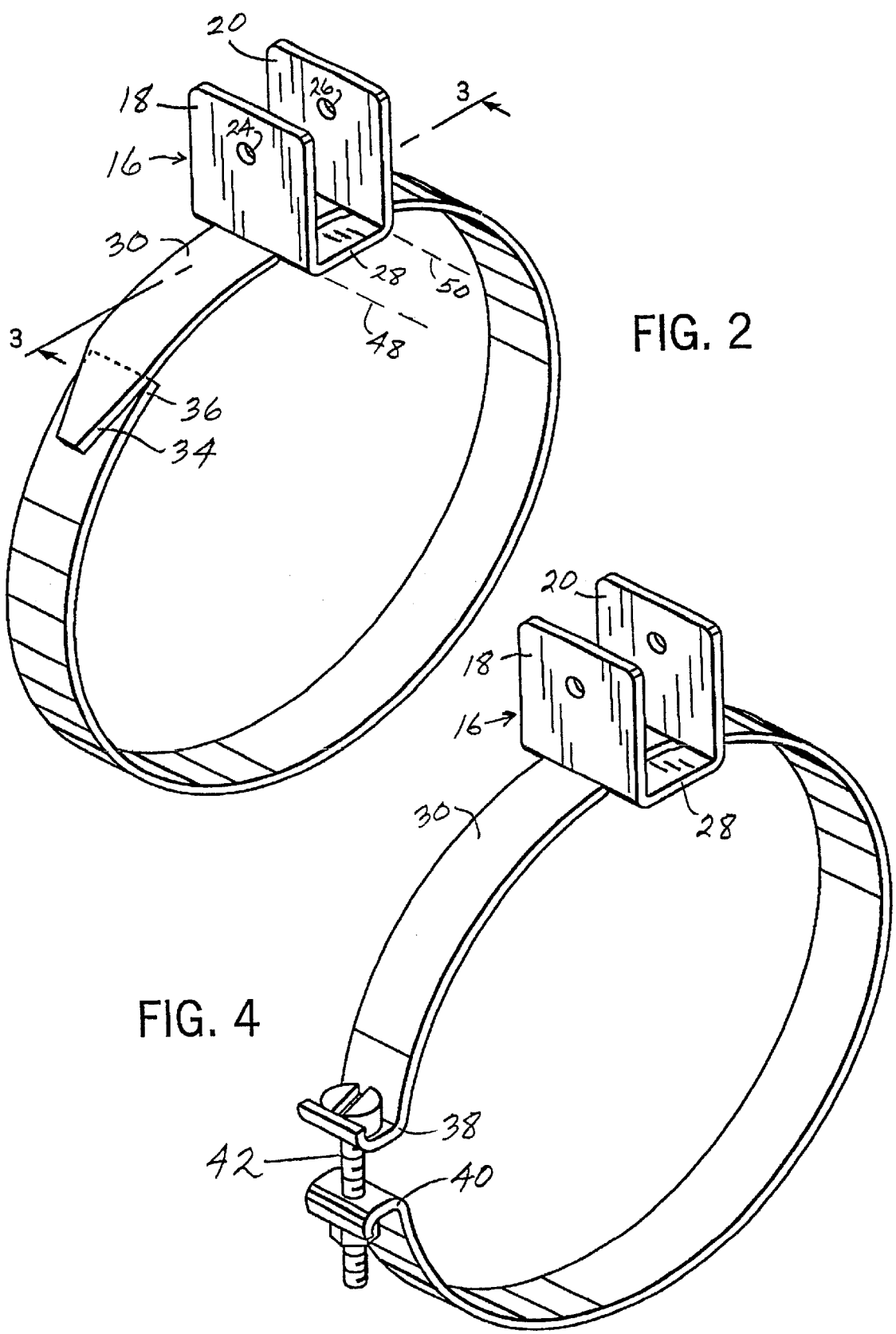

MUFFLER HANGER SYSTEM

BACKGROUND AND SUMMARY

The invention relates to muffler hangers.

The invention arose during development efforts directed to mounting mufflers in a horizontal position and providing a durable attachment of the muffler to a vehicle chassis. Such attachment devices should provide isolation and allow for temperature expansion of the system. Accomplishment of these requirements often necessitates complex and costly hanging systems and assembly processes.

The present invention provides a simple and effective system allowing ease of assembly, and providing economic advantages and service flexibility. The present system eliminates subassembly fixturing, requires minimal material, and provides significant weight and cost savings. The present system enables the manufacturer to have a cost effective first fit hanger, e.g. a welded strap, and a similar service part, e.g. a Torca clamp or other adjustable device. Different sized muffler bodies can be accommodated easily, as well as different vertical positioning of the muffler.

DESCRIPTION OF THE DRAWINGS

FIG. 2 is a view of a portion of FIG. 1.

FIG. 4 is like FIG. 2 and shows another embodiment.

DETAILED DESCRIPTION

Figure 1:
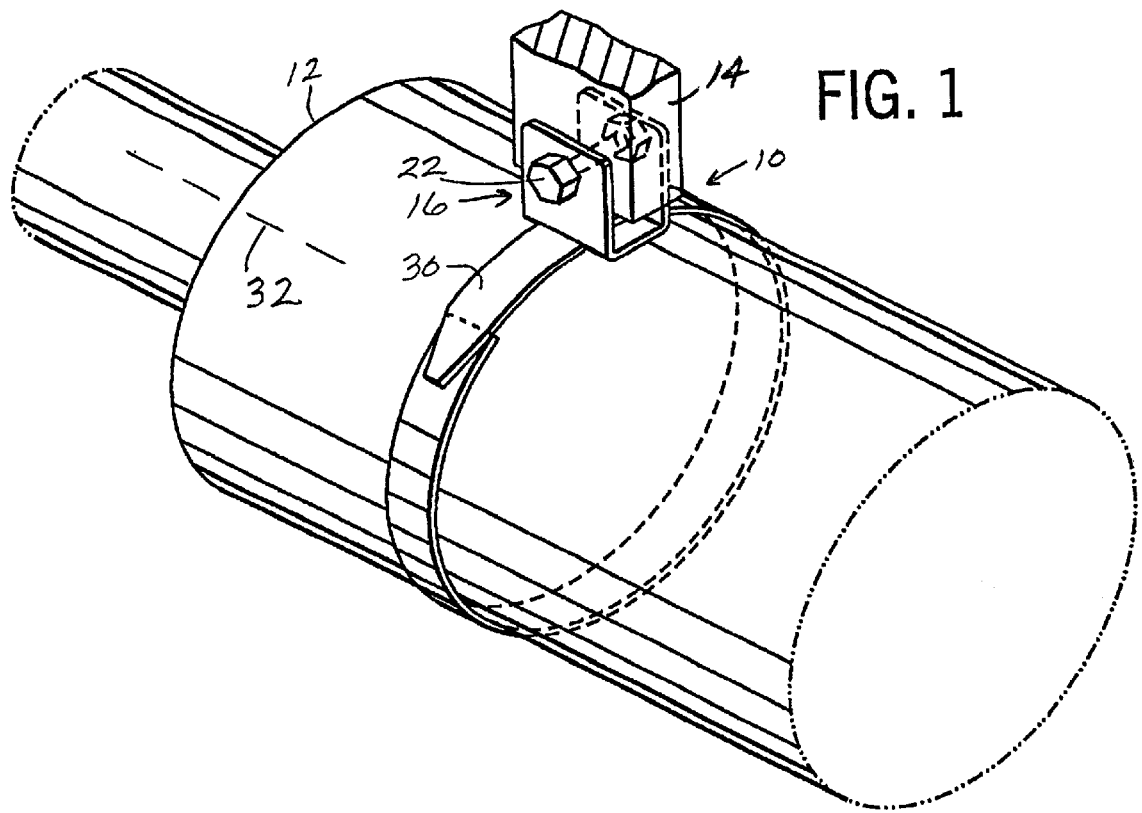
FIG. 1 is an isometric view of a muffler hanger in accordance with the invention.

FIG. 1 shows a muffler hanger 10 for supporting a muffler 12 from a support 14, for example part of a vehicle chassis. The hanger includes a U-shaped bracket 16, FIGS. 1, 2 having a pair of legs 18 and 20 securable to support 14, for example by bolt 22 passing through apertures 24 and 26 in legs 18 and 20, respectively. The U-shaped bracket has a bight 28 extending between legs 18 and 20. A band or strap 30 extends around muffler 12 and bight 28 and clamps muffler 12 against and supports the muffler from bight 28. Bight 28 is between band 30 and muffler 12, FIG. 3.

Figure 3:
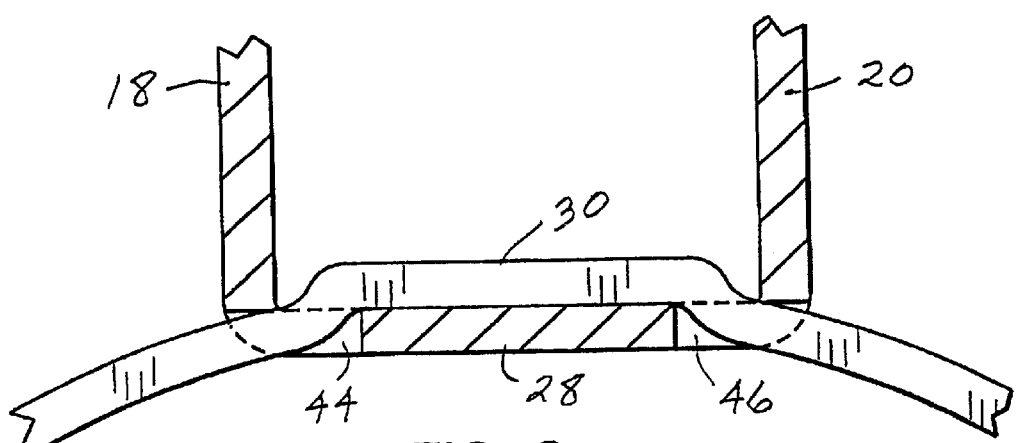
FIG. 3 is a sectional view taken along line 3—3 of FIG. 2.

Legs 18, 20 and bight 28 are co-planar along the noted U-shape in a given plane, which is the plane of the page in FIG. 3. Band 30 extends in a loop around muffler 12, and the plane of such loop is the noted given plane of the noted U-shape. Muffler 12 extends axially along an axis 32, FIG. 1. The noted given plane of the noted U-shape is normal to axis 32. In FIG. 2, band 30 is a closed loop having ends 34 and 36 welded to each other. In FIG. 4, the band is a loop having ends 38 and 40 adjustable and tightenably clamped to each other, for example by a Torca clamp 42, which is known.

Leg 18 lies in a first plane, which plane is into the page in FIG. 3, extending axially and radially relative to axis 32. Second leg 20 lies in a second plane, which plane is into the page in FIG. 3, extending axially and radially relative to axis 32. Bight 28 lies in a third plane, which plane is into the page in FIG. 3, extending axially and tangentially relative to axis 32. The noted third plane is normal to the noted first and second planes. The plane of band 30 as it extends around muffler 12 is normal to the noted first and second planes.

U-shaped bracket 16, FIG. 3, has a pair of distally opposite slots 44 and 46 therethrough, spaced along band 30 and through which band 30 extends. The slots are preferably at the junction of the respective leg 18 or 20 and bight 28, such that a portion of the slot is through the leg and a portion of the slot is through the bight, though the slots may be formed only through the legs or only through the bight.

Hanger bracket 16 is made by initially providing a flat sheet extending along a length dimension and a width dimension, the width dimension being into the page in FIG. 3, then punching first and second slots 44 and 46 through the sheet spaced along the noted length dimension, each slot extending along the noted width dimension, then bending the sheet along first and second bend lines 48 and 50, FIG. 2, at first and second slots 44 and 46, respectively, the bend lines 48 and 50 extending along the noted width dimension. The sheet is bent along the bend lines 48 and 50 to the noted U-shape having first and second legs 18 and 20, and bight 28 extending between such legs. Leg 18 extends from bight 28 at bend line 48 and slot 44. Leg 20 extends from bight 28 at bend line 50 and slot 46. To hang muffler 12, band 30 is extended around the muffler and through slots 44 and 46 to support muffler 12 from bight 28. Band 30 is secured, e.g. by welding, FIG. 2, or an adjustable clamp, FIG. 4, or the like, with an appropriate tension to restrain the bracket and band assembly from moving relative to the muffler. The manufacturer can have a cost effective first fit hanger, e.g. a welded band as in FIG. 2, and a similar service part such as a Torca clamp or other adjustable clamp for replacement service. Different sized muffler bodies can be accommodated easily by changing the length of band 30. Different vertical positioning of the muffler can be readily accommodated by simply changing the length of the bracket, e.g. the length of legs 18 and 20, and/or the vertical position of apertures 24 and 26. Bracket 16 and band 30 are preferably sheet metal. The noted length dimension of bracket 16 is preferably greater than the noted width dimension of such bracket.

It is recognized that various equivalents, alternatives and modifications are possible within the scope of the appended claims.

What is claimed is:

1. A muffler hanger comprising a U-shaped bracket having a pair of legs securable to a support, and a bight extending between said legs, and a band extending around said muffler and said bight and supporting said muffler from said bight, wherein said bight is between said band and said muffler.

2. The muffler hanger according to claim 1 wherein said bracket has a pair of distally opposite slots therethrough spaced along said band and through which said band extends.

3. The muffler hanger according to claim 1 wherein said band clamps said muffler against said bight.

4. The muffler hanger according to claim 1 wherein said legs and said bight are co-planar along said U-shape in a given plane, and said band extends in a loop around said muffler, and wherein the plane of said loop is said given plane.

5. The muffler hanger according to claim 1, wherein said muffler extends axially along an axis, and said legs and said bight are co-planar along said U-shape in a given plane, and wherein said given plane is normal to said axis.

6. The muffler hanger according to claim 5 wherein said band extends in a loop around said muffler, and wherein the plane of said loop is said given plane.

7. The muffler hanger according to claim 6 wherein said band is a closed loop.

8. The muffler hanger according to claim 6 wherein said band is a closed loop having ends welded to each other.

9. The muffler hanger according to claim 6 wherein said band is a loop having ends adjustably and tightenably clamped to each other.

10. The muffler hanger according to claim 9 wherein said ends are clamped to each other by a Torca clamp.

11. A muffler hanger comprising a U-shaped bracket having a pair of legs securable to a support, and a bight extending between said legs, and a band extending around said muffler and said bight and supporting said muffler from said bight, wherein said bracket has a pair of distally opposite slots therethrough spaced along said band and through which said band extends, and said slots comprise a first slot through the intersection of one said legs and said bight, and a second slot through the intersection of the other of said legs and said bight, said first and second slots being distally oppositely spaced from each other along said bight.

12. A muffler hanger comprising a U-shaped bracket having a pair of legs securable to a support, and a bight extending between said legs, and a band extending around said muffler and said bight and supporting said muffler from said bight, wherein said bracket has a pair of distally opposite slots therethrough spaced along said band and through which said band extends, and said slots are through said legs and comprise a first slot through one of said legs and a second slot through the other of said legs.

13. A muffler hanger comprising a U-shaped bracket having a pair of legs securable to a support, and a bight extending between said legs, and a band extending around said muffler and said bight and supporting said muffler from said bight, wherein said bracket has a pair of distally opposite slots therethrough spaced along said band and through which said band extends, and said slots are through said bight and comprise a first slot through said bight adjacent one of said legs, and a second slot through said bight adjacent the other of said legs.

14. A muffler hanger bracket comprising a sheet extending along a length dimension and a width dimension and having first and second slots punched therethrough and spaced along said length dimension, each said slot extending along said width dimension, said sheet being bent along first and second bend lines at said first and second slots, respectively, said bend lines extending along said width dimension, said sheet being bent along said bend lines to a U-shape having first and second legs and a bight extending between said legs, said first leg extending from said bight at said first bend line and said first slot, said second leg extending from said bight at said second bend line and said second slot, said first and second legs and said bight forming said U-shape.

15. The muffler hanger bracket according to claim 14, wherein said length dimension is greater than said width dimension.

16. The muffler hanger bracket according to claim 14 further comprising in combination a band extending around said muffler and through said slots and supporting said muffler from said bight.

17. A method for making a muffler hanger bracket comprising providing a flat sheet extending along a length dimension and width dimension, punching first and second slots through said sheet spaced along said length dimension, each slot extending along said width dimension, bending said sheet along first and second bend lines at said first and second slots, respectively, said bend lines extending along said width dimension, bending said sheet along said bend lines to a U-shape having first and second legs and a bight extending between said legs, such that said first leg extends from said bight at said first bend line and said first slot, said second leg extends from said bight at said second bend line and said second slot, and said first and second legs and said bight form said U-shape.

18. The method according to claim 17 further comprising in combination a method for hanging a muffler comprising extending a band around said muffler and through said slots and supporting said muffler from said bight.

\* \* \* \* \*